United States Patent
Whitney et al.

(10) Patent No.: US 8,577,578 B2
(45) Date of Patent: Nov. 5, 2013

(54) METHOD OF CONTROLLING VEHICLE WHEEL AXLE TORQUE AND CONTROL SYSTEM FOR SAME

(75) Inventors: Christopher E. Whitney, Commerce, MI (US); Richard B. Jess, Haslett, MI (US); Danny Abdow, Sterling Heights, MI (US); Thomas Richard Durkin, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/272,455

(22) Filed: Oct. 13, 2011

(65) Prior Publication Data
US 2013/0096797 A1   Apr. 18, 2013

(51) Int. Cl.
*B60T 7/12* (2006.01)
*B60W 10/00* (2006.01)
*F02P 5/00* (2006.01)

(52) U.S. Cl.
USPC ................... 701/90; 180/65.265; 123/406.23

(58) Field of Classification Search
USPC ............... 701/8, 93, 301–302, 84, 87, 90, 22; 123/436, 406.23; 180/6.28, 180/65.265–65.285, 301, 302; 318/136, 318/400.15, 432, 434
See application file for complete search history.

(56) References Cited

U.S. PATENT DOCUMENTS

| | | | |
|---|---|---|---|
| 2007/0191181 A1 | 8/2007 | Burns | |
| 2009/0037073 A1* | 2/2009 | Jung et al. | 701/101 |
| 2009/0234534 A1* | 9/2009 | Stempnik et al. | 701/34 |
| 2010/0089673 A1 | 4/2010 | Wisniewski | |
| 2010/0116250 A1* | 5/2010 | Simon et al. | 123/436 |
| 2011/0046829 A1 | 2/2011 | Tamai et al. | |

* cited by examiner

*Primary Examiner* — Muhammad Shafi
(74) *Attorney, Agent, or Firm* — Quinn Law Group, PLLC

(57) ABSTRACT

A method of controlling torque on a vehicle wheel axle includes comparing a torque intervention request to a predetermined minimum axle torque for a current vehicle speed and a current direction of motion of the vehicle. The predetermined minimum axle torque decreases as vehicle speed in an operator-selected direction of motion increases. An arbitrated axle torque is calculated based on an operator-requested torque, the current vehicle speed, the current direction of motion, and the greater of the torque intervention request and the predetermined minimum torque. Axle torque is applied to the vehicle's wheel axle based at least partially on the arbitrated axle torque.

14 Claims, 2 Drawing Sheets

METHOD OF CONTROLLING VEHICLE WHEEL AXLE TORQUE AND CONTROL SYSTEM FOR SAME

TECHNICAL FIELD

The invention relates to a method of controlling vehicle wheel axle torque and a control system for same, especially for preventing propulsion in a direction opposite of an intended direction of motion.

BACKGROUND

The direction of intended motion of a vehicle is determined by the vehicle driver, typically by the position of the driver's shift lever position. When the driver has the shift lever position in park or neutral, no motion is intended in either forward or reverse. When the driver has the shift lever position in drive, low or manual, the direction of intended motion is the forward direction. When the driver has the shift lever position in reverse, the direction of intended motion is the reverse direction.

Conventional powertrains are typically protected from motion in a direction opposite from the direction of intended motion because an engine cannot make torque while spinning itself backward. The transmission directly connects the engine to the direction of intended motion by providing a linkage to the axles that supports axle torque in the direction of intended motion.

However, on hybrid or fuel cell applications with one or more electric motors, the electric motor can provide torque while spinning in either direction. Therefore, the possibility of propelling the vehicle in the direction opposite of intended motion exists.

SUMMARY

On some hybrid applications, an electronic control module (ECM) interprets the operator's accelerator pedal position and determines the operator's desired axle torque. It then arbitrates it against other axle torque "intervention" requests such as vehicle overspeed protection, traction or stability control, and cruise control. A final arbitrated axle torque request is then sent from the ECM to a hybrid control module (HCM) that determines how to use the combination of engine, electric motors and transmission to achieve the desired axle torque.

When a vehicle is moving in the direction of intended motion at any speed greater than a relatively low speed, such as about 5 miles per hour (mph), when the driver takes his foot off of the accelerator pedal, the ECM should request negative axle torque to decelerate the vehicle. When the vehicle speed is approaching zero, application of a negative axle torque has the potential to propel the vehicle backward depending on the magnitude of the request. Accordingly, a creep control system should apply an increasing positive torque (and not negative torque) as the vehicle speed decreases below a predetermined threshold positive speed and when the vehicle speed becomes negative. This will, for example, minimize vehicle rollback on hills when an operator stops a vehicle on an uphill grade and then releases the brake.

A method of controlling axle torque includes determining an operator-selected direction of motion for a vehicle, a vehicle speed, and an actual direction of motion of the vehicle. At least one torque intervention request is then compared to a predetermined minimum axle torque for the vehicle speed and the actual direction of motion. The "predetermined minimum axle torque" is also referred to as a "predetermined axle torque limit". A "torque intervention request" is a requested axle torque that is requested by another vehicle system that is considered by the control system in order to determine torque at the vehicle wheels. Because the torque intervention request is not an operator request, it is referred to as an intervention. The other vehicle systems may be, by way of non-limiting example, a vehicle overspeed system, a traction or stability control system, a brake torque control system, or a vehicle speed limiter system. In determining "predetermined minimum axle torque", axle torque in the direction of intended motion is considered positive. Axle torque in the direction opposite to axle torque that would propel the vehicle in the direction of intended motion is considered negative and so has an increasing negative value as speed increases in the direction of intended motion. The operator-requested axle torque may be determined by a driver-operated accelerator device, such as an accelerator pedal. The operator-selected direction of motion may be determined from a driver-operated shift lever.

The method includes calculating arbitrated axle torque that is based on an operator-requested axle torque and the at least one torque intervention request if the at least one torque intervention request is greater than the predetermined minimum axle torque, but that is instead based on the predetermined minimum axle torque if the at least one torque intervention request is not greater than the predetermined minimum axle torque. The arbitrated axle torque may then be applied to the driven wheel axle(s).

The predetermined minimum axle torque may function as a creep coast system torque limit at vehicle speeds below a first threshold speed. Accordingly, the predetermined minimum axle torque may increase when vehicle speed is below a predetermined threshold speed and slowing, and also when the actual direction of motion of the vehicle is opposite to the operator-selected direction of motion. Furthermore, the predetermined minimum axle torque may decrease (i.e., have an increasing negative torque value) up to a predetermined threshold value as vehicle speed increases. The predetermined threshold value may be a maximum negative axle torque limit applicable regardless of vehicle speed to prevent excessive unintended (i.e., not operator-requested) vehicle deceleration.

The method may be especially useful for hybrid or fuel cell vehicles that have an electric motor that may add axle torque to the wheel axle(s) in either direction. On such vehicles, a first controller, such as an engine control module in the case of a hybrid vehicle, may be operatively connected with the driver-operated shift lever, with the driver-operated accelerator device, and with at least one torque control system that provides the torque intervention request. The first controller has a processor with a first algorithm that calculates the arbitrated axle torque as described above. A second controller is operatively connected with the first controller and with a vehicle axle. The second controller may be a hybrid controller that controls and coordinates the engine and the electric motor/generators to apply axle torque to the vehicle axle. The second controller receives a signal corresponding with the arbitrated axle torque from the first controller and has a second algorithm that determines how to establish the arbitrated axle torque to be applied to the vehicle axle.

Accordingly, the method and control system control propulsion in a direction opposite the direction of intended motion by largely preventing it even when vehicle systems present torque intervention requests. The method and control system also limit negative axle torque to prevent excessive vehicle deceleration.

The above features and advantages and other features and advantages of the present invention are readily apparent from the following detailed description of the best modes for carrying out the invention when taken in connection with the accompanying drawings.

DETAILED DESCRIPTION

Figure 1:
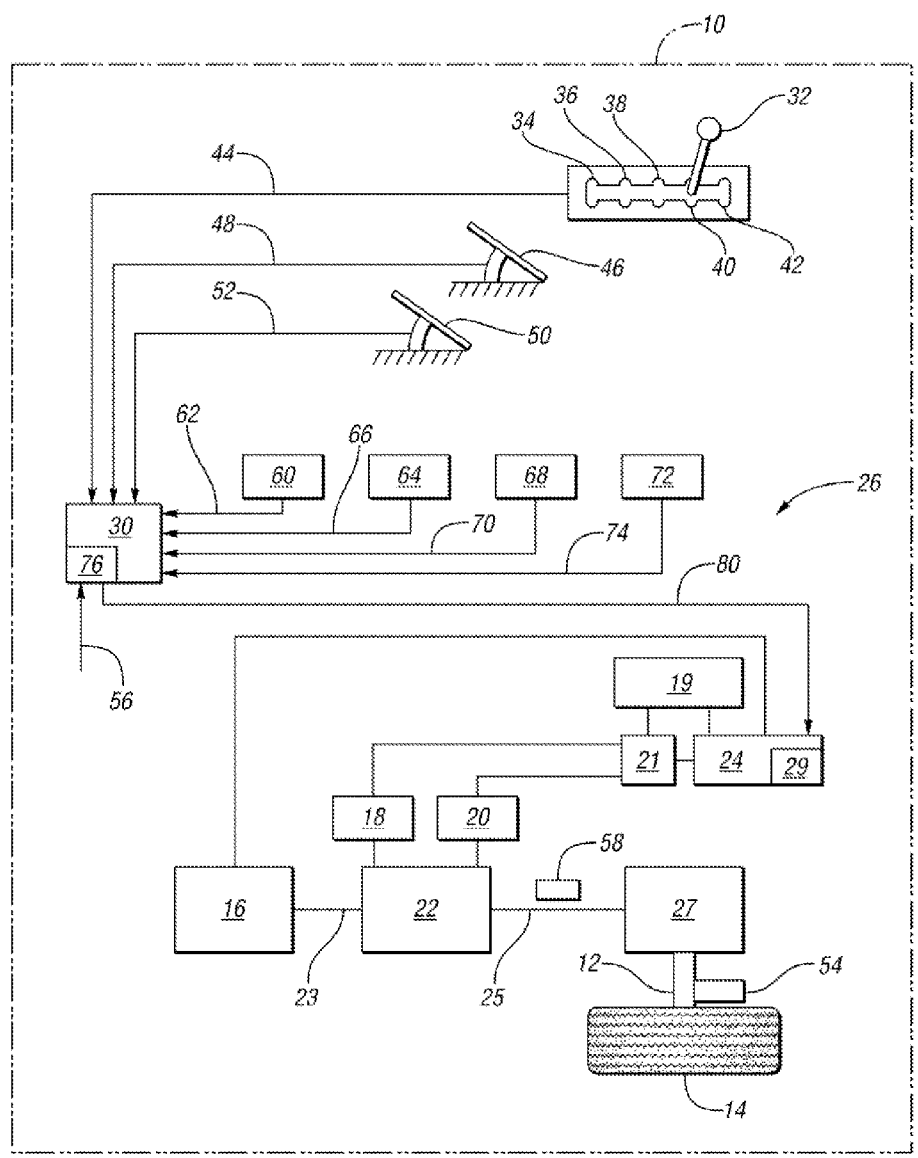
FIG. 1 is a schematic illustration of a hybrid vehicle having a control system that prevents propulsion in a direction opposite of an intended direction of motion.

Referring to the drawings, wherein like reference numbers refer to like components throughout the several views, FIG. 1 shows a vehicle 10 that is propelled when axle torque is provided to a wheel axle 12 of a vehicle wheel 14. Only one wheel axle 12 is shown. Within the scope of the claimed invention, the vehicle 10 may be a front wheel-drive, a rear wheel-drive or an all wheel-drive vehicle. As shown, the vehicle 10 is a hybrid vehicle having both an engine 16 and two motor/generators 18, 20. However, the vehicle 10 may instead be an electric vehicle that has motor/generators but no engine, or may be a fuel cell vehicle that has only a fuel cell that powers one or more electric motor/generators. The vehicle 10 may have multiple operating modes depending upon engagement of clutches or brakes in a transmission 22, and depending on whether the engine 16 is on and whether the motor/generators 18, 20 are each separately controlled to function as a motor or as a generator.

The engine 16 is operatively connected to an input member 23 of the transmission 22. A speed ratio from the input member 23 to an output member 25 of the transmission 22 is determined by a speed ratio established in the transmission 22 according to the engaged clutches and brakes and whether the engine 16 is on and/or the motor/generators are controlled as motors or as generators. A final drive gearing arrangement 27 may establish an additional speed ratio between the output member 25 and the wheel axle 12.

The vehicle 10 may have multiple operating modes such as an electric-only operating mode in which the engine 16 is off and the vehicle 10 is powered by one motor/generator 18 functioning as a motor, a load-sharing electric-only operating mode in which the engine 16 is off and the vehicle 10 is powered by both motor/generators 18, 20 functioning as motors, a charge-sustaining series operating mode in which the engine 16 powers the motor/generator 18 to function as a generator, and the motor/generator 18 provides electrical power to the motor/generator 20 which functions as a motor. Finally, the vehicle 10 may have a charge-sustaining operating mode in which the engine 16 powers the motor/generator 18 to function as a motor and the motor/generator 20 also functions as a motor. These operating modes are coordinated by a hybrid control module (HCM) 24, referred to herein as a second controller, that includes a hybrid control processor 29 having a stored algorithm that determines how wheel torque is to be provided utilizing one or more of the engine 16 and the motor/generators 18, 20. A battery 19 has stored electric energy and is operatively connected to the motor/generators 18, 20 through a power inverter 21 that converts direct current to alternating current when power is provided from the battery 19 to either or both motor/generators 18, 20 functioning as motors, and from alternating current to direct current when power is provided to the battery 19 from one or both of the motor/generators 18, 20 functioning as generators.

Axle torque provided at the wheel axle 12 is determined based partially on an operator-requested axle torque and on torque intervention requests received from other vehicle systems, with the torque intervention requests being subject to limitations imposed by a control system 26 that controls and largely prevents propulsion in a direction of motion opposite the intended direction of motion and also prevents excessive deceleration of the vehicle 10. The operator may be a driver, in which case the operator-requested axle torque is the axle torque desired by the driver.

The control system 26 includes an electronic control module (ECM) 30 as well as the HCM 24. The ECM 30 is referred to herein as a first controller and receives multiple driver-controlled input signals. For example, a driver-operated shift lever 32 is selectively movable by a driver to park 34, reverse 36, neutral 38, drive 40 and low 42 positions. In the park 34 and neutral 38 positions, the driver's intention is that the vehicle 10 has no motion or propulsion. When the shift lever 32 is placed in the reverse 36 position, the driver-selected direction of motion for the vehicle 10 (i.e., "direction of intended motion") is in a reverse direction. When the shift lever 32 is placed in the drive 40 position or low 42 position, the driver-selected direction of motion for the vehicle is in the forward direction. The shift lever 32 is configured so that a driver-selected direction signal 44 is provided to the ECM 30.

A driver-operated accelerator device 46 such as an accelerator pedal is operable to provide a driver-requested axle torque signal 48 to the ECM 30. The driver-requested axle torque signal 48 is an electrical signal representative of the position of the accelerator device 46 which can be correlated with a driver-requested axle torque at the wheel axle 12. The axle torque request is the sum of the torque at all axles. In an all wheel-drive application, a 400 Nm request may be achieved with 200 Nm on both axles or 300 Nm on one axle and 100 Nm on the other axle.

A driver-operated braking device 50 such as a brake pedal is operable to provide a driver-requested braking torque signal 52 to the ECM 30. The driver-requested braking torque signal 52 is representative of the position of the braking device 50 which can be correlated with a driver-requested braking torque applied via a brake system 54 to the wheel axle 12. Braking torque is axle torque in a direction opposite to the driver-requested axle torque associated with the accelerator device 46.

The ECM 30 also receives a vehicle speed signal 56 such as from a speed sensor 58. The speed signal 56 indicates rotational speed of the output member 25, as well as the direction of rotation of the output member 25.

The ECM 30 may receive signals from one or more additional vehicle torque control systems not directly controlled by the vehicle operator. These systems provide requests for axle torque at the wheel axle 12 in response to vehicle operating conditions. Such axle torque requests not directly made by the vehicle operator are referred to herein as "torque intervention requests". For example, one vehicle torque control system may be a vehicle overspeed system 60 that generates a vehicle overspeed system axle torque request signal 62 to request a negative torque at the wheel axle 12 in response to a determination that the vehicle speed is beyond a predetermined maximum speed threshold. As used herein, "negative torque" is axle torque at the wheel axle 12 in a direction opposite the axle torque at the wheel axle 12 that provides propulsion in the direction of intended motion. Positive torque is axle torque at the wheel axle 12 that provides propulsion in the direction of intended motion.

Another vehicle torque control system may be a traction or stability control system 64 that generates a traction control system torque request signal 66. The traction control system torque request signal 66 could be correlated with a request for either positive or negative torque at the wheel axle 12 as necessary for overcoming wheel slip or drag.

A brake torque control system 68 is another vehicle torque control system that may be used to generate a brake torque request signal 70 that is correlated with a request for negative torque to be applied at the wheel axle 12 allowing the use of regenerative braking instead of friction braking. The brake torque request signal may alternately be a positive value only which limits operator requested axle torque to alleviate excessive friction braking torque needed of the braking system 54. That is, the brake torque control system 68 requests a maximum amount of axle torque to be applied at the wheel axle 12 to enable braking torque correlated with the driver requested braking torque signal 52 without going beyond predetermined mechanical limits of the braking system 54.

A vehicle speed limiter system 72 is another vehicle torque control system that may be used to generate a vehicle speed limiter torque request signal 74 correlated with a request for an amount of negative torque to be applied at the wheel axle 12 to reduce vehicle speed. Such a system 72 may be used to reduce vehicle speed to a creep range in the event of theft of the vehicle 10.

Other torque control systems may also be provided that send torque request signals to the ECM 30 that are not initiated by the vehicle operator to regulate axle torque at the vehicle wheel axle 12.

Figure 2:
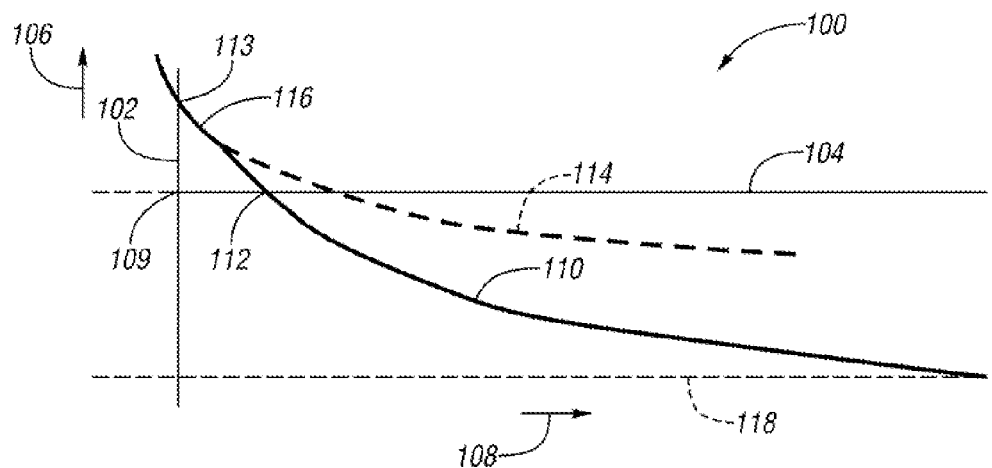
FIG. 2 is a plot of axle torque versus vehicle speed showing a predetermined axle torque limit curve that establishes a limit on negative axle torque applied at a vehicle's wheel axle to prevent propulsion in a direction opposite the intended direction, and has a minimum threshold axle torque that is independent of vehicle speed to prevent excessive deceleration.

The ECM 30 has a processor 76 that has a stored algorithm and that, along with the processor 29 in the hybrid control module 24, carries out a method 200 of controlling wheel axle torque. The method 200 is illustrated as a flow diagram in FIG. 3, and is described with respect to the vehicle 10 of FIG. 1 and a plot 100 in FIG. 2 of axle torque 102 (vertical axis) versus vehicle speed 104 (horizontal axis) showing a predetermined axle torque limit curve 110. The predetermined torque axle limit curve 110 of FIG. 2 indicates a predetermined axle torque limit (i.e., a predetermined minimum axle torque) for a given vehicle speed and direction of motion. In FIG. 2, axle torque in the driver-selected direction of motion (i.e., the operator-intended direction of motion) increases in the direction of arrow 106 from an axle torque of zero at point 109. Axle torque decreases in the direction opposite arrow 106 and has an increasing negative value in the direction opposite arrow 106 below point 109. The horizontal axis indicates vehicle speed, with vehicle speed in the intended direction of motion increasing in the direction of arrow 108 from a speed of zero at point 109. Vehicle speed increases in the direction opposite the direction of intended motion in the direction opposite that of arrow 108 beginning at point 109. The values of the predetermined axle torque limit for each given vehicle speed and for the actual direction of motion (i.e., the values of the points establishing the predetermined axle torque limit curve 110) may be stored in the ECM 30 as a look-up table. The predetermined axle torque limit curve 110 acts as a limit on torque intervention requests so that, when the torque intervention requests as limited are arbitrated with driver-requested axle torque, the axle torque applied will prevent propulsion of the vehicle 10 in a direction opposite the intended direction 108. Below a predetermined threshold speed 112, the predetermined axle torque limit curve 110 generally follows a standard creep coast curve 114, as indicated at 116. The creep coast curve 114 is shown for comparison purposes only, as the predetermined axle torque limit curve 110 is the limit actually applied under the method 200. The creep coast curve 114 represents a limit on negative axle torque that may be applied at zero accelerator pedal torque and is designed to prevent axle torque in a direction opposite the direction of intended motion, but does not take into account torque intervention requests. As is evident in FIG. 2, at vehicle speeds above the predetermined threshold speed 112, the predetermined axle torque limit curve 110 allows a lower minimum torque (i.e., a greater axle torque in the direction opposite the direction of intended motion) than the creep coast curve 114.

A minimum axle torque threshold 118 that is independent of vehicle speed is applied as a cutoff value of the predetermined axle torque limit curve 110 to prevent excessive deceleration. Thus, the predetermined minimum axle torque limit cannot be less than the minimum axle torque threshold value (i.e., cannot have a greater negative value than the minimum threshold 118).

Figure 3:
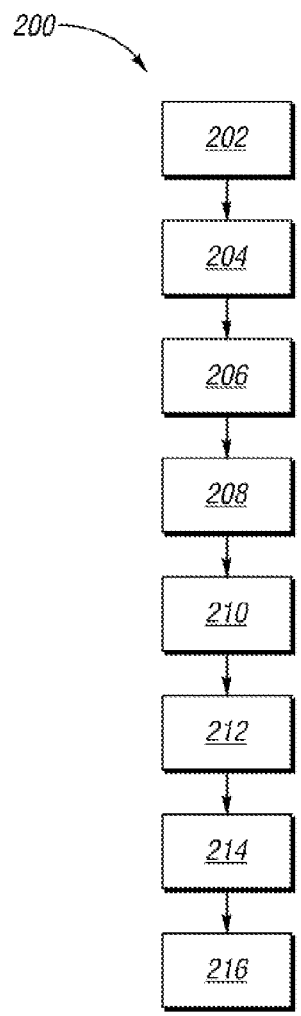
FIG. 3 is a flow diagram of a method of controlling the vehicle's wheel torque.

Referring now to FIG. 3, the method 200 carried out in part by the ECM 30 and in part by the HCM 24 begins with block 202 in which a driver-selected direction of motion is determined. This is determined based on the signal 44 indicative of the position of the driver-operated shift lever 32. In block 204, vehicle speed is determined. Vehicle speed may be determined based on the signal 56 from the speed sensor 58. In block 206, the actual direction of motion of the vehicle 10 is determined. This may also be determined from the speed signal 56, which indicates the direction of rotational motion of the output member 25.

In block 208, a driver-requested axle torque and at least one torque intervention request are received by the ECM 30. The driver-requested axle torque is received via the signal 48 from the accelerator device 46 and signal 52 from the driver-operated braking device 50. Generally, only one of the signals 48, 52 will indicate a requested axle torque value, as a vehicle operator generally does not depress both the accelerator device 46 and the braking device 50 at the same time. However, if both the accelerator device 46 and the braking device 50 are pressed at the same time the braking device 50 request can be used to cancel the acceleration request from the accelerator device 46. The torque intervention request is received as one or more of the signals 62, 66, 70 or 74 from the vehicle overspeed system 60, the traction or stability control system 64, the braking torque control system 68, and the vehicle speed limiter system 72, respectively. Blocks 202, 204, 206 and 208 need not occur in the order shown in the flow diagram of FIG. 3.

Once the ECM 30 determines or receives the information in blocks 202, 204, 206 and 208, then, in block 210, the processor 76 compares the torque intervention request (or multiple torque intervention requests) received to the predetermined axle torque limit (i.e., the value indicated by axle torque limit curve 110) stored in a lookup table for the vehicle speed determined in block 204 and the direction of motion determined in block 206.

Next, the processor 76 calculates an arbitrated axle torque in block 212. The arbitrated axle torque is calculated according to a stored algorithm and is based on the driver-requested axle torque received in block 208 and indicated by signal 48 and/or signal 52. The arbitrated axle torque is also based on those of the one or more torque interventions requests 62, 66, 70, 74 that are greater than the predetermined axle torque limit indicated by curve 110 for the determined vehicle speed and the actual direction of motion. Finally, for any of the one or more torque intervention requests that are less than the predetermined axle torque limit for the determined vehicle speed and actual direction of motion (i.e., for any torque intervention requests for axle torque below the predetermined axle torque limit curve 110), the predetermined minimum axle torque limit for the determined vehicle speed and actual direction of motion will be used by the algorithm in lieu of the value of the torque intervention request. This helps to ensure that torque applied at the axle 12 under the method 200 will not be in the direction opposite the driver-intended direction of motion for the vehicle 10. Optionally the predetermined minimum axle torque indicated by curve 110 may be limited to a value greater than the predetermined threshold excessive deceleration value 118.

One example of the stored algorithm used for calculating arbitrated axle torque is an algorithm that first identifies the lowest decreasing torque intervention request as well as the highest increasing torque intervention request. These torque intervention requests are after having been compared with and limited by the predetermined minimum axle torque limit as described above. The torque intervention request is decreasing if it is a request for a lower axle torque than the current axle torque, and is increasing if it is a request for an axle torque higher than the current axle torque. If the lowest decreasing torque intervention request is below the driver-requested axle torque, then the lowest decreasing torque intervention request is the arbitrated axle torque value. If the lowest decreasing torque intervention request is above driver-requested axle torque, and the highest increasing torque intervention request is above the driver-requested axle torque, then the lower of the highest increasing torque intervention request and the lowest decreasing torque intervention request is the arbitrated axle torque value. If neither of the two statements above is true, then the driver-requested axle torque is the arbitrated axle torque.

In block 214 the arbitrated axle torque value is sent via signal 80 to the HCM 24 for application to the axle 12. In block 216, the HCM 24 determines how to coordinate control of the engine 16, and the motor/generators 18 and 20 to provide the arbitrated axle torque.

When the method 200 is applied to control axle torque on the vehicle 10, the application of greater negative axle torque than heretofore applied by previous methods is possible without causing propulsion in the direction opposite the direction of intended motion.

While the best modes for carrying out the invention have been described in detail, those familiar with the art to which this invention relates will recognize various alternative designs and embodiments for practicing the invention within the scope of the appended claims.

The invention claimed is:

1. A method of controlling torque on a wheel axle comprising:
   comparing at least one torque intervention request to a predetermined minimum axle torque for a current vehicle speed and a current direction of motion of the vehicle; wherein the predetermined minimum axle torque decreases as vehicle speed in an operator-selected direction of motion increases;
   calculating via a controller an arbitrated axle torque based on an operator-requested axle torque, the current vehicle speed, the current direction of motion, and the greater of said at least one torque intervention request and the predetermined minimum axle torque; and
   applying axle torque to the wheel axle based at least partially on the arbitrated axle torque.

2. The method of claim 1, wherein the predetermined minimum axle torque is limited to a value greater than a single predetermined threshold value for all vehicle speeds, thereby limiting maximum vehicle deceleration.

3. The method of claim 1, wherein said at least one torque intervention request includes at least one of a vehicle overspeed system torque request, a traction or stability control system torque request, a brake torque control system torque request, and a vehicle speed limiter system torque request.

4. The method of claim 1, wherein said predetermined minimum axle torque functions as a creep coast system torque limit at vehicle speeds below a first threshold speed.

5. A method of controlling wheel axle torque comprising:
   determining an operator-selected direction of motion for a vehicle;
   determining vehicle speed;
   determining an actual direction of motion of the vehicle;
   comparing at least one torque intervention request to a predetermined axle torque limit for the vehicle speed and the actual direction of motion;
   calculating via a controller an arbitrated axle torque; wherein the arbitrated axle torque is based on an operator-requested axle torque and said at least one torque intervention request if said at least one torque intervention request is greater than the predetermined axle torque limit;
   wherein the arbitrated axle torque is based on the operator-requested axle torque and the predetermined axle torque limit if said at least one torque intervention request is not greater than the predetermined axle torque limit; and
   applying the arbitrated axle torque to a wheel axle of the vehicle, thereby preventing motion of the vehicle in a direction opposite the operator-selected direction of motion.

6. The method of claim 5, wherein the predetermined axle torque limit increases as vehicle speed decreases when vehicle speed is below a predetermined threshold speed and also when the actual direction of motion of the vehicle is opposite to the operator-selected direction of motion.

7. The method of claim 5, wherein the predetermined axle torque limit decreases up to a predetermined threshold value as vehicle speed increases when the actual direction of motion and the operator-selected direction of motion are the same.

8. The method of claim 5, wherein the predetermined axle torque limit functions as a creep coast system torque limit at vehicle speeds below a predetermined threshold speed.

9. The method of claim 5, wherein said at least one torque intervention request includes a vehicle overspeed system torque request.

10. The method of claim 5, wherein said at least one torque intervention request includes a traction or stability control system torque request.

11. The method of claim 5, wherein said at least one torque intervention request includes a brake torque control system torque request.

12. The method of claim 5, wherein said at least one torque intervention request includes a vehicle speed limiter system torque request.

13. The method of claim 5, wherein the predetermined axle torque limit is limited to a value greater than a single predetermined threshold value for all vehicle speeds, thereby limiting maximum vehicle deceleration.

14. A method of controlling torque on a wheel axle comprising:

comparing at least one torque intervention request to a predetermined minimum axle torque for a current vehicle speed and a current direction of motion of the vehicle; wherein the predetermined minimum axle torque decreases as vehicle speed in an operator-selected direction of motion increases;

calculating via a controller an arbitrated axle torque based on an operator-requested axle torque, the current vehicle speed, the current direction of motion, and the greater of said at least one torque intervention request and the predetermined minimum axle torque;

applying axle torque to the wheel axle based at least partially on the arbitrated axle torque; wherein the predetermined minimum axle torque is limited to a value greater than a predetermined threshold value for all vehicle speeds, thereby limiting maximum vehicle deceleration; and wherein said predetermined minimum axle torque functions as a creep coast system torque limit at vehicle speeds below a first threshold speed.

* * * * *